(12) United States Patent
Son et al.

(10) Patent No.: US 8,279,288 B2
(45) Date of Patent: Oct. 2, 2012

(54) METHOD FOR AUTOMATICALLY PHOTOGRAPHING PANORAMIC PICTURE

(75) Inventors: Byung-Jun Son, Seoul (KR); Soo-Kyun Kim, Seoul (KR); Tae-Hwa Hong, Seoul (KR); Sung-Dae Cho, Yongin-si (KR); Sang-Wook Oh, Ansan-si (KR)

(73) Assignee: Samsung Electronics Co., Ltd., Samsung-ro, Yeongtong-gu, Suwon-si, Gyeonngi-do (KR)

( * ) Notice: Subject to any disclaimer, the term of this patent is extended or adjusted under 35 U.S.C. 154(b) by 690 days.

(21) Appl. No.: 12/336,766

(22) Filed: Dec. 17, 2008

(65) Prior Publication Data
US 2009/0153685 A1    Jun. 18, 2009

(30) Foreign Application Priority Data
Dec. 18, 2007    (KR) .................. 10-2007-0133459

(51) Int. Cl.
*H04N 5/228* (2006.01)
(52) U.S. Cl. ...................... 348/208.1; 348/36
(58) Field of Classification Search ............. 348/333.05, 348/208.1, 36, 39
See application file for complete search history.

(56) References Cited

U.S. PATENT DOCUMENTS

| 6,304,284 | B1 * | 10/2001 | Dunton et al. ................. 348/36 |
| 6,867,801 | B1 * | 3/2005 | Akasawa et al. ............ 348/222.1 |
| 6,930,703 | B1 * | 8/2005 | Hubel et al. .................... 348/37 |
| 7,072,398 | B2 * | 7/2006 | Ma ........................... 375/240.16 |
| 8,077,213 | B2 * | 12/2011 | Gulliksson ................. 348/218.1 |
| 2004/0189849 | A1 * | 9/2004 | Hofer ........................ 348/333.03 |
| 2004/0190613 | A1 * | 9/2004 | Zhu et al. .................. 375/240.12 |
| 2004/0258154 | A1 * | 12/2004 | Liu et al. ................... 375/240.16 |
| 2005/0099494 | A1 * | 5/2005 | Deng et al. ..................... 348/36 |
| 2007/0085913 | A1 * | 4/2007 | Ketelaars et al. ............. 348/239 |
| 2007/0147812 | A1 * | 6/2007 | Nenonen et al. ................ 396/20 |
| 2007/0263995 | A1 * | 11/2007 | Park et al. ....................... 396/50 |

OTHER PUBLICATIONS

Zhu, et al., "A New Diamond Search Algorithm for Fast Block-Matching Motion Estimation", Feb. 2000, IEEE Transactions on Image Processing, vol. 9, No. 2, pp. 287-290.*

* cited by examiner

*Primary Examiner* — Jason Chan
*Assistant Examiner* — Gary C Vieaux
(74) *Attorney, Agent, or Firm* — Cha & Reiter, LLC

(57) ABSTRACT

A method for photographing a panoramic picture, and for identifying motion of a photographing apparatus to automatically photograph respective images of a panoramic picture. The method steps include: (a) obtaining a first image in response to a request for a panoramic picture photography; (b) identifying motion of a photographing apparatus having obtained the first image, by applying a motion estimation technique to currently input images; (c) automatically determining a photographing direction based on the identified motion of the photographing apparatus; (d) selectively applying a motion estimation technique for estimating motion in a horizontal direction or a vertical direction, according to the determined photographing direction, and identifying motion of the photographing apparatus; (e) judging photographing time points of respective images by identifying that the identified motion of the photographing apparatus has reached a preset threshold value for decision of the photographing time point; and (f) photographing images at the photographing time point of the respective images.

16 Claims, 3 Drawing Sheets

METHOD FOR AUTOMATICALLY PHOTOGRAPHING PANORAMIC PICTURE

CLAIM OF PRIORITY

This application claims the benefit under 35 U.S.C. §119(a) from an application entitled "Method For Automatically Photographing Panoramic Picture" filed in the Korean Industrial Property Office on Dec. 18, 2007 and assigned Serial No. 2007-0133459, the contents of which are hereby incorporated by reference in its entirety.

BACKGROUND OF THE INVENTION

1. Field of the Invention

The present invention relates to a panoramic photography method. More particularly, the present invention relates to a method for identifying motion of a photographing apparatus and automatically photographing respective images of a panoramic picture.

2. Description of the Related Art

Conventionally, an image capture unit functions to obtain an image in a digital image photographing apparatus by forming an image within a focal length of a lens thereof. Here, the obtained image is within a range of the viewing angle (between about 30° to 50° for general cameras), which is smaller than the human visual angle (between about 150° to 200°). In a conventional method of photographing multiple images while properly changing the viewing angle, and inter-connecting the photographed images in sequence to reorganize them into one consecutive image, thereby obtaining a picture with a viewing angle similar to or larger than the human visual angle, such a conventional method is referred to as a method for photographing a panoramic picture.

In a panoramic picture photographing mode, a conventional digital image photographing apparatus photographs several images to be inter-connected horizontally or vertically, and then stores them in a memory. The images stored in the memory are subsequently provided to an appropriate interior/exterior image processor, and are inter-connected into one consecutive image. At this time, in order to eliminate color differences and image discords at the boundaries between the images, digital image photographing apparatuses photograph multiple images with sufficient overlap between their boundaries, and then align the images by adjusting their boundaries. Thereafter, the apparatuses perform image processing, including stitching and bending. Through this process, a single image including naturally inter-connected multiple images is obtained.

High priority in photographing a panoramic picture is preferably placed on the capture of such images being aligned as accurately as possible. To this end, an accessory apparatus, such as a tripod, is usually used in a manual photographing by a user. Recently, a method has been suggested in which a corresponding photographing apparatus is mounted on a tripod or the like, and the mounted photographing apparatus is rotated according to respective images in panorama photographing. An example of such a method is disclosed in Korean Patent Application No. 2003-0052444 filed on Jul. 29, 2003, entitled "Camera And Method for Photographing Panorama Picture", the applicant of which is Samsung Techwin Co. Ltd., and the inventor of which is BAE, Sung-cheol. Further to the above-described methods, a method has also been suggested, in which an apparatus having a function of detecting a rotation angle may be additionally mounted on the corresponding photographing apparatus, and a user sets the rotation angle of the photographing apparatus in advance so that the respective images are photographed by rotational displacement over the rotation angle of the photographing apparatus pre-set by the user in panorama photographing.

Furthermore, in order to align the respective images more accurately in a case of photographing panoramic pictures without mounting an accessory element or additional hardware on the corresponding photographing apparatus, a method has been provided in which the partial region of the border of a previously photographed image is represented appropriately overlapping with the current image for photographing when photographing respective images, so that the user can control an appropriate position for photographing by adjusting the pre-photographed image with the current photographing image. An example of such the method is disclosed in US Publication No. 2004/0189849 filed on Mar. 31, 2003, entitled "Panoramic Sequence Guide" in the name of an inventor, Gregory V. Hofer.

Photographing the panoramic picture requires more user-sophistication and proficiency vis-a-vis photographing a general single image, and this has necessitated better and more convenient solutions for manipulating and photographing images.

SUMMARY OF THE INVENTION

Accordingly, the present invention provides a panoramic photography method for automatically determining a photographing direction of a panoramic picture based on initial motion of a user, and automatically recognizing a photographing time point in order to effectively photograph a panoramic picture, thereby obtaining images within the panoramic picture.

Moreover, the present invention provides a panoramic photography method for effectively identifying motion of a photographing apparatus in determining a photographing direction and a photographing time point.

In accordance with an exemplary aspect of the present invention, there is provided a method for photographing a panoramic picture, the method including the steps of: (a) obtaining a first image in response to a request for a panoramic picture photography; (b) identifying motion of a photographing apparatus having obtained the first image, by applying a motion estimation technique to currently input images; (c) automatically determining a photographing direction based on the identified motion of the photographing apparatus; (d) selectively applying a motion estimation technique capable of preferentially estimating motion for a horizontal direction or a vertical direction, according to the determined photographing direction, and identifying motion of the photographing apparatus; (e) judging photographing time points of respective images by identifying that the identified motion of the photographing apparatus has reached a preset threshold value for decision of the photographing time point; and (f) photographing images at the photographing time point of the respective images.

In step (c), the photographing direction of the panoramic picture may be determined by identifying that the motion of the photographing apparatus has reached a threshold value including a preset direction.

Preferably, the motion estimation technique of step (b) corresponds to a diamond search method.

Preferably, when the photographing direction determined in step (c) comprises a generally horizontal direction, the motion of the photographing apparatus is identified by applying a motion estimation technique capable of preferentially estimating motion for a horizontal direction, and when the photographing direction determined in step (c) comprises a generally vertical direction, the motion of the photographing apparatus is identified by applying a motion estimation technique capable of preferentially estimating motion for a vertical direction.

The motion estimation technique preferably estimates motion for a horizontal direction may correspond to a horizontal hexagonal search method, and the motion estimation technique estimates motion for a vertical direction that may correspond to a vertical hexagonal search method.

Step (d) may include a step of outputting a User Interface (UI) which guides movement of a corresponding photographing apparatus in the photographing direction determined in step (c), after identifying the motion of the photographing apparatus.

Preferably, in step (d), the motion of the photographing apparatus is identified by comparing currently input images in real-time with previous images, a preset zone within the entire range of the current frames is set to a motion area tracking zone, and motion information is obtained through the comparison of previous frames for images within the motion area tracking zone.

In step (d), at least one pixel block with a preset size is set within the motion area tracking zone, pixel blocks corresponding to previous frames most like corresponding pixel blocks are detected, and the motion information is obtained by using a relative location variation degree between corresponding pixel blocks.

Step (f) may include the steps of: displaying, on the photographing apparatus, the fact that the photographing time point of each of the images has been reached; and photographing images in response to a photographing instruction signal input from outside.

In step (f), the photographing time point of each of the images has been reached may be displayed on the photographing apparatus, and a corresponding image may be automatically photographed.

Preferably, image photography information including a distance from a subject and optical magnification can be identified so as to calculate a distance of an actual photography range of an image, and motion of the photographing apparatus is identified in consideration of the distance of the actual photography range of the image.

The preset threshold value indicating that the photographing time point is reached in step (e) may be set in reflection of a photograph pattern that includes a camera movement speed, a rotation angle, and a degree at which the camera is shaken, while the user performs panoramic photographing.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, an exemplary embodiment according to the present invention will be described with reference to the accompanying drawings. In the description below, many particular items such as a detailed component apparatus are shown, but these are given only for providing the general understanding of the present invention, it will be understood by those skilled in the art that the present invention. The examples have been provided for illustrative purposes only and the claimed invention is not limited to the example shown and described herein.

Figure 1:
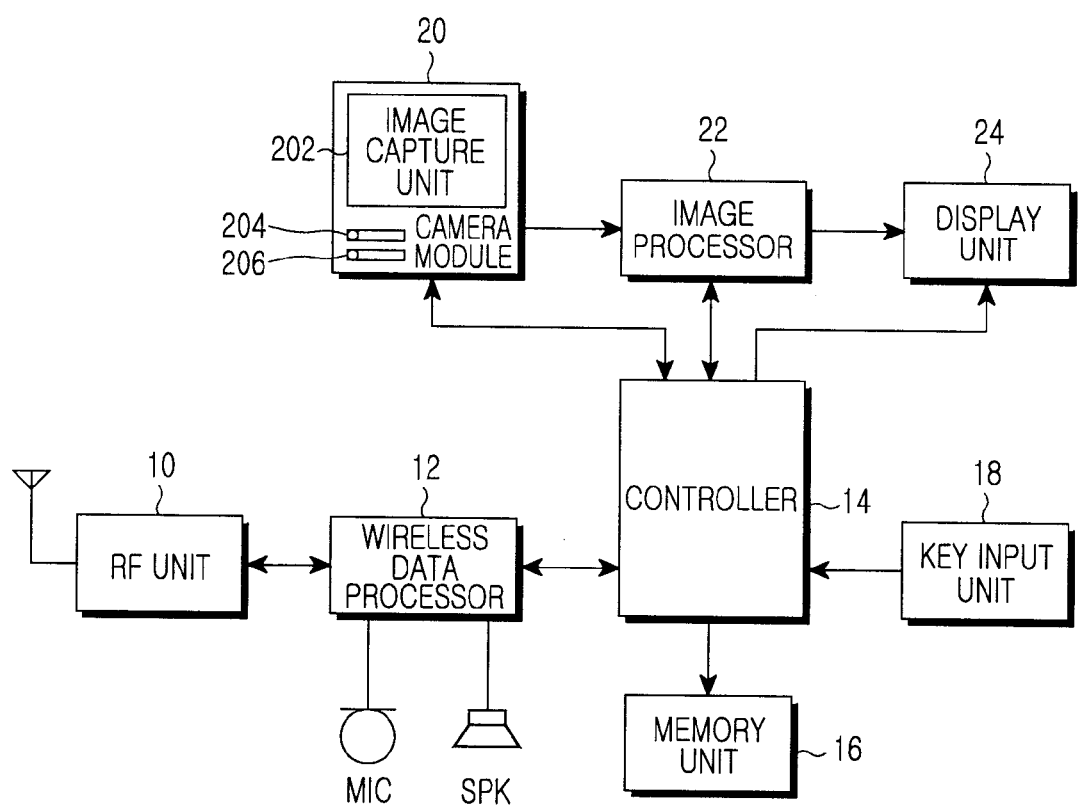
FIG. 1 is a block diagram illustrating an exemplary mobile terminal to which the present invention can be applied.

FIG. 1 is a block diagram of a mobile terminal according to the present invention. Hereinafter, among diverse apparatuses having a function of digital image photography, a hardware-based apparatus will be described first with an example of the mobile terminal as shown in FIG. 1.

Referring to the example shown FIG. 1, the mobile terminal having the function of digital image photographing according to this illustrative example of the present invention includes a camera 20, an image processor 22, and a display unit 24, as well as a controller 14, a memory unit 16, a key input unit 18, a Radio Frequency (RF) unit 10, and a wireless data processor 12.

The RF unit 10 modulates user voice, text messages and control data into wireless signals, and transmits the modulated signals to a base station (not shown) of a mobile radio communications network. The RF unit 10 also receives wireless signals from the base station, and then demodulates them into a voice, text messages, control data or the like, to output them. Under the control of the controller 14, the wireless data processor 12 decodes voice data received from the RF unit 10 to output an audible sound via a speaker, generates data including the user voice signal received from a microphone to output it to the RF unit 10, and supplies text messages and control data input via the RF unit 10 to the controller 14.

The camera 20 performs general digital camera functions under the control of the controller 14, and photographs visible rays input from an external photography object. The camera 20 may include the image capture unit 202 formed with a charge-couple device (CCD) photographing device or the like, as well as a luminance sensor 204 for measuring luminance, and a distance sensor 206 for measuring a focal distance from a subject or the like. The image processor 22 processes image data output to the camera 20 to convert the processed data into digital image data of a suitable format.

The key input unit 18 for receiving a telephone number or text messages from the user includes a plurality of keys for inputting numbers and text message information and a plurality of function keys for setting diverse functions, and outputs their input signals to the controller 14. The display unit 24 may include the display devices, such as a liquid crystal display (LCD) or the like, and displays photographed digital image data including the messages corresponding to various operating states of the corresponding mobile terminal under the control of the controller 14.

The controller 14 controls the general operation of a mobile communications terminal through general control of the respective function units. That is, the controller 14 performs a process according to the number and menu of selecting signals input via the key input unit 18, receives an external photographing signal via the camera 20 to process correspondingly, and outputs the images photographed by the camera as well as the image output signals necessary for diverse operations through the display unit 24. At this time, the controller 14 brings contexts for output stored in the memory unit 16 or stores the contexts in the memory unit 16. The memory unit 16 can store a plurality of programs and data related to the operation of the controller 14, and is used for storing information required for manipulating the mobile terminal and camera photographing image information.

The mobile terminal having the configuration as described above preferably performs functions of a camera as well as operations relating to conventional mobile communications services. At this time, the controller 14 performs the operation of panoramic image photography according to characteristics of the present invention as well. Further, the memory unit 16 stores the operating program and relative information for the operation of panoramic image photography in the controller 14, and outputs the corresponding information to the controller 16 where necessary, according to the present invention.

Especially, at the time of panoramic image photographing according to the present invention, the mobile terminal receives the image of the subject in real-time like a moving picture. Also, when the mobile terminal is moved by the user according to the photographing direction of the panoramic image (or by an additional apparatus equipped with the corresponding the mobile terminal to automatically rotate the mobile terminal), the mobile terminal obtains motion information of the corresponding mobile terminal by comparing the current input image with the previous image. Then, the mobile terminal recognizes the direction of motion and the degree of movement, and obtains the image corresponding to the sequential images for creating an adequate panoramic image.

Hereinafter, the operations of panoramic photographing according to exemplary embodiments of the present invention will be described with reference to the accompanying drawings.

Figure 2:
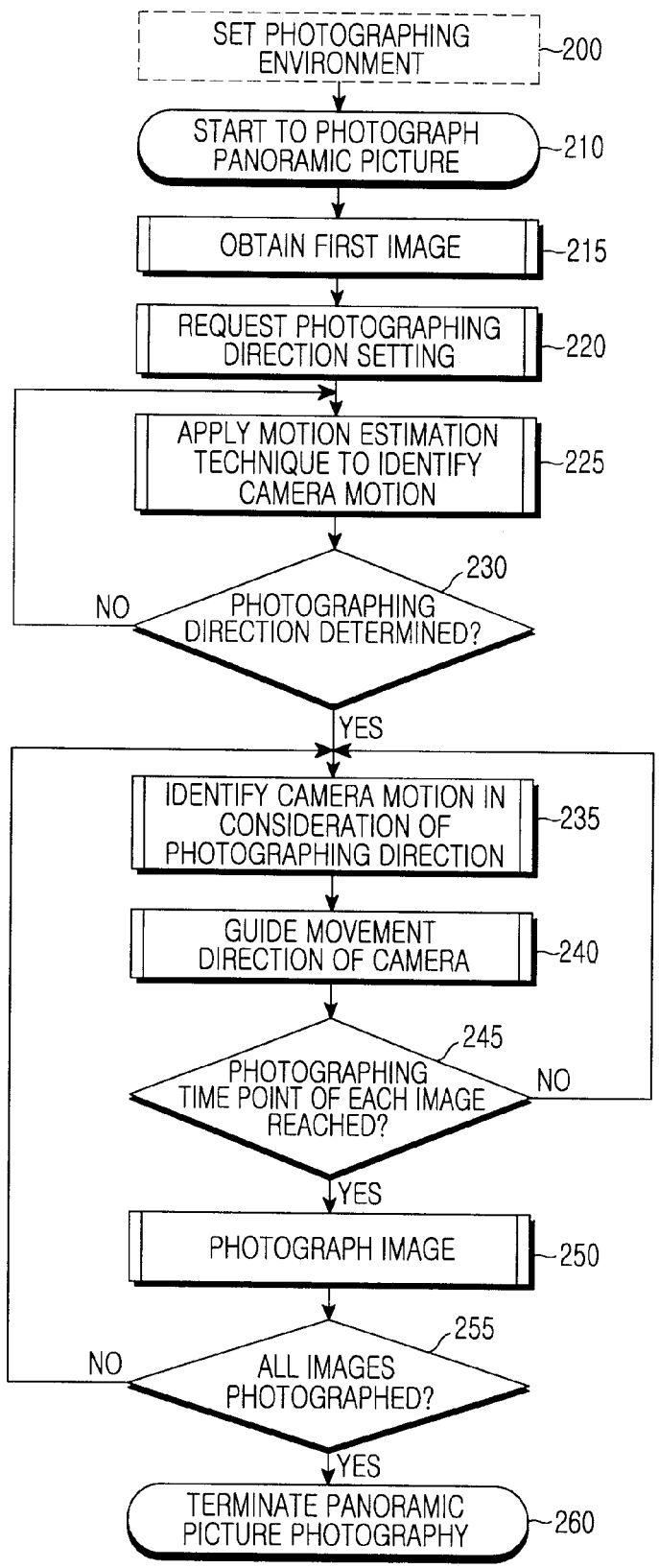
FIG. 2 is a flowchart illustrating an exemplary operation of photographing a panoramic picture according to one embodiment of the present invention.

FIG. 2 is a flowchart for illustrating an exemplary operation of photographing the panoramic picture according to this exemplary embodiment of the present invention. Referring to FIG. 2, various environments for photographing the panoramic picture are set in step 200, which is performed prior to actual panoramic picture photography. For example, the number of photography images to be inter-connected to form the panoramic picture is set in step 200.

In the operation for setting the panoramic picture photographing environment in step 200, the respective environment setting values from the user are input in selecting a sub-menu of the camera photographing menu (e.g. panoramic picture photographing environment setting mode) from among the menus for setting diverse functions provided by the conventional mobile terminal. As a matter of course, the configurations and operating programs for displaying the corresponding menus for the menu selecting operation and confirming a key input to the key input unit from the user are provided in the mobile terminal in advance. In addition, some or all among respective panoramic picture photographing environment modes set by the user in step 200 may be fixed as a value adequately set by a developer that is provided to the user.

In step 210, among sub-menus of the camera photographing menu in menus of the mobile terminal, a "panoramic picture photographing mode" is selected. For example, a menu key provided on the mobile terminal or a menu displayed on the mobile terminal is selected by user's input in step 210.

In step 215, a first image of the panoramic picture is obtained. At this time, the first image of the panoramic picture can be stored, for example, by a shutter input of the user, which is a method similar to that of conventional photography, and subsequent image photography will be performed based on the panoramic picture photographing method according to an exemplary embodiment of the present invention which will be described in more detail.

Figure 3:
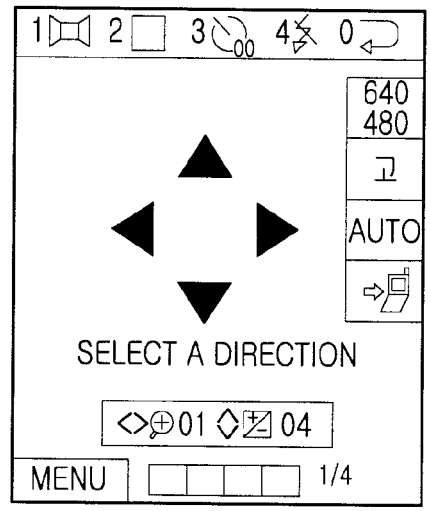
FIG. 3 is an exemplary view of a UI for setting a photographing direction in a method for photographing a panoramic picture according to one exemplary embodiment of the present invention.

As such, when the first image is obtained in step 215, the user is preferably guided to set a photographing direction through an appropriate User Interface (UI) so that the user can move the camera in a direction for the panoramic picture photography in step 220. At this time, an appropriate icon indicating a direction for the panoramic picture photography may be displayed to the user through the display unit. For example, as shown in FIG. 3, real-time input images are displayed together with above, below, left, and right directions for the panoramic picture photography on the display unit of the mobile terminal, and then the user is guided to select one direction of the displayed directions and move the camera.

Still referring to FIG. 2, in step 225, motion of the camera is identified by applying a motion estimation technique to input images subsequent to the first image obtained in step 215. Particularly, images that are obtained by the photographing apparatus are stored in a memory in real-time at a predetermined period (e.g. for exemplary purposes, one-fifteenth of a second) of time starting from a photographing time point of the first image in step 215. That is, images obtained by the photographing apparatus are received like moving pictures, and then frames constituting the images are stored in the memory, respectively. Then, motion of a corresponding photographing apparatus (i.e. camera) is identified by using an image input during current unit time and an image input during previous unit time, from among images converted in real time from the image frames sequentially input at a predetermined period of time. Identifying the motion of the camera in step 225 is achieved by estimating motion vectors between blocks (i.e. blocks with the highest similarity) which are matched through comparison of proper-sized image blocks between current frames and previous frames. In this particular example, the motion vectors may be estimated in a manner somewhat similar to those used for motion estimation and motion compensation at the time of encoding and decoding of general moving pictures. In the following exemplary description of the present invention, a motion vector corresponding to an x axis (i.e. a transverse direction) and a motion vector corresponding to a y axis (i.e. a longitudinal direction) are defined as $m_{i,x}$, and $m_{i,y}$, respectively (i denotes a sequential number of frames).

That is, in step 225, motion of the photographing apparatus necessary to automatically determine a direction for the panoramic picture photography is identified. Therefore, the motion vectors of blocks within the images input through the photographing apparatus are estimated in consideration of directions for the panoramic picture photography. Preferably, in step 225, a diamond search method suitable for simultaneously identifying vertical and horizontal motions is employed as a method for estimating the motion vector between the blocks.

Still referring to FIG. 2, in step 230, motion vector values of the vertical and horizontal directions identified in step 225 are continuously accumulated up to a predetermined threshold value. When the accumulated motion vector value reaches the predetermined threshold value including the photographing direction, the photographing direction within the accumulated value of the motion vectors is set to a direction for the panoramic picture photography based on it. An accumulation value of the motion vectors in the transverse direction (i.e. the vectors corresponding to the x axis) can be calculated by equation (1) below, and an accumulation value of motion vectors in a longitudinal direction (i.e. the vectors corresponding to the y axis) can be calculated by equation (2) below:

$$Mx = \sum_i m_{i,x} \quad (1)$$

$$My = \sum_i m_{i,y} \quad (2)$$

When the accumulation value $M_x$ of motion vectors calculated by equation (1) reaches a left threshold value having a transverse directionality, the direction for the panoramic picture photography is set to the left. In contrast, when the accumulation value $M_x$ of the motion vectors reaches a right threshold value, the direction for the panoramic picture photography is set to the right. In this exemplary manner, when the accumulation value $M_y$ of motion vectors calculated by equation (2) reaches an upper threshold value having longitudinal directionality, the direction for the panoramic picture photography is set to an upper direction. In contrast, when the accumulation value $M_y$ reaches a lower threshold value, the direction for the panoramic picture photography can be set to a lower direction.

Figure 4:
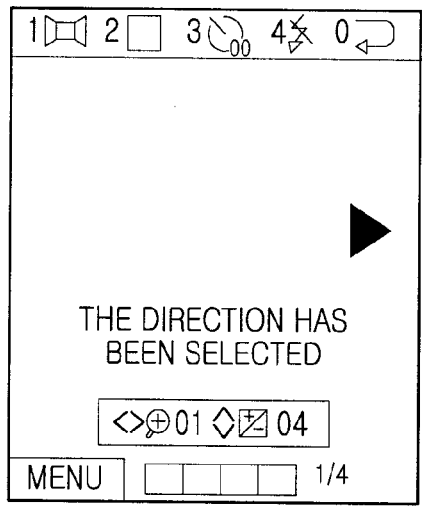
FIG. 4 is an exemplary view of a UT for guiding a photographing apparatus in a photographing direction of each image in a method for photographing a panoramic picture according to one exemplary embodiment of the present invention.

After the direction for the panoramic picture photography is set in step 230, the user is guided to move the camera in that direction for the panoramic picture photography through an appropriate UI. In this particular case, an appropriate icon that indicates the direction for the panoramic picture photography may be displayed on the display unit to the user. For example, as shown in FIG. 4, the direction for the panoramic picture photography is displayed together with a real-time input image on the display unit of the mobile terminal, and then the user is guided to move the camera in the set direction.

In step 235, motion of the camera is identified by using images stored at a predetermined period of time (e.g. one-fifteenth of a second) of step 225. Preferably, in step 235, the motion of the camera is identified in consideration of the direction for the panoramic picture photography set in step 230, so that it is possible to reduce an operation required to identify the camera motion. For example, when the photographing direction is set to a transverse direction (e.g. left or right direction) in step 230, it is predicted that the user will move the camera in the transverse direction for panoramic photographing. Therefore, it is preferred that, when the photographing direction is set to the transverse direction, motion vectors are calculated by applying the motion estimation technique capable of preferentially identifying horizontal motion. Additionally, in this manner, it is preferred that, when the photographing direction is set to the longitudinal direction (e.g. upper or lower direction) in step 230, motion vectors are calculated by applying the motion estimation technique capable of preferentially identifying vertical motion.

Moreover, a horizontal hexagonal search method may be employed as the motion estimation technique for preferentially identifying generally horizontal motion, and a vertical hexagonal search method may be employed as the motion estimation technique for preferentially identifying generally vertical motion.

As such, by applying a motion estimation technique suitable for the photographing direction set in step 230, the present invention renders it possible to accurately and rapidly identify motion of the photographing apparatus in determining photographing time points of respective images forming the panoramic picture. According to the present invention, it is also possible to effectively reduce an operation amount required to identify motion of the photographing apparatus in determining the photographing time points of respective images.

In step 240, a movement direction toward which the camera should move to perform a panoramic picture photography based on the camera motion identified in step 235 is notified to the user through the appropriate UI. In this case, an appropriate icon indicating the movement direction of the camera may be displayed on the display unit to the user.

Figure 5:
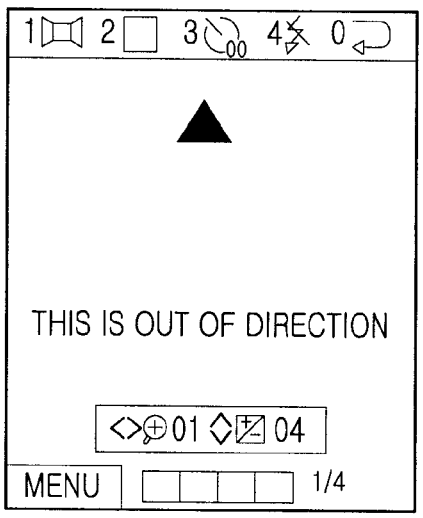
FIG. 5 is an exemplary view of a UI for guiding a photographing apparatus in a photographing direction of each image in a method for photographing a panoramic picture according to one exemplary embodiment of the present invention.

For example, in the case where the panoramic picture photography is performed in a direction from left to right, by $m_{i,x}$ of the motion vector on the x axis, when it is detected that the camera currently moves in a lower direction instead of a right direction, an arrow-shaped icon indicating an upper direction may be displayed on the preview screen so as to guide the movement of the camera toward the direction for the panoramic picture photography, as shown in FIG. 5.

In step 245, it is identified whether or not the photographing time point of each of images has been reached according to the camera motion identified in step 235. As a result of the identification in step 245, when the photographing time point has been reached, steps following step 245 are performed. If not, the process returns to step 235 in which the above-described steps are repeatedly performed. The judgment as to whether or not the photographing time point has been reached may be determined by comparing a sum total, obtained by accumulating the motion vectors of vertical and horizontal directions, with the predetermined threshold value.

For example, when the panoramic picture photography is currently performed in a right direction from the first image, the accumulation value of the motion vectors of the horizontal direction is calculated as defined by equation (1). Then, the calculated accumulation value of the motion vectors of the horizontal direction is compared with a horizontal threshold value $H_{th}$. As a result of the comparison, when the calculated accumulation value of the motion vectors of the horizontal direction is equal to or relatively higher than the horizontal threshold value $H_{th}$, it is judged that the photographing time point is reached. Moreover, when the panoramic picture photography is currently performed in a left direction from the first image, the accumulation value of the motion vectors of the horizontal direction is calculated, as in the case of photographing the panoramic picture in the right direction. In this case, the motion vectors of the left direction from the first image are calculated as negative integers. Then, the calculated value is compared with the horizontal threshold value $-H_{th}$ converted from an integer code. As a result of the comparison, when the calculated accumulation value of the motion vectors of the horizontal direction is equal to or relatively lower than the horizontal threshold value $-H_{th}$ converted from an integer code, it is judged that the photographing time point is reached. Furthermore, when the panoramic picture photography is currently performed in an upper or lower direction from the first image, an accumulation value of motion vectors of vertical direction is calculated as defined by equation (2). Then, the calculated accumulation value of the motion vectors of the vertical direction is compared with a vertical threshold value $V_{th}$ or a vertical threshold value $-V_{th}$ converted from an integer code. As a result of the comparison, it is judged whether a photographing time point is reached.

In addition, when the accumulation value of the motion vectors is out of a predefined range of the horizontal or vertical threshold values ($V_{th}$, $-V_{th}$, $H_{th}$, and $+H_{th}$), an appropriate icon warning of being outside the predefined range may be displayed on the preview screen (see FIG. 5).

In step 250, a corresponding image is obtained. At this time, the fact that a current location is suitable for the panoramic picture photography may be notified to the user through the appropriate UT. Then, the image may be manually obtained at user's photographing request, or automatically obtained, according to the preset photographing environment. The manual or automatic panoramic image photographing mode can be set along with when setting the panoramic image photographing environment illustrated in step 200.

According to the present invention, when panoramic photographing is automatically performed, it is within the spirit and scope of the invention to use input image frames without any modification, or to obtain image frames projected on a cylindrical or spherical surface to be used as images forming the panoramic picture, so as to identify the camera motion. It is also within the spirit and scope of the invention to prepare images for the panoramic picture by projecting images obtained through photographing onto a curved surface having an equal focal distance.

The frames of the images, which are used to identify motion of the camera, may be different from images of the panoramic picture. Therefore, in the case where the frames is used only for identification of the camera motion, it is sufficient if the quality of the images of the frames is as good as necessary for detection of the camera motion performed in the following steps. That is, the frames may be set to have as many pixels as necessary for identification of the camera motion.

In step 255, it is identified whether the number of currently photographed images reaches the total number of the images preset in step 200. As a result of the identification in step 225, when the number of the currently photographed images does not reach the total number of the preset images, the process returns to step 235 in which the above-described steps are repeatedly performed. In contrast, when the number of the currently photographed images reaches the total number of the preset images, the panoramic picture photography is terminated in step 260. After the panoramic picture photography is terminated, subsequently photographed images are interconnected to create one panoramic picture. In order to interconnect the multiple images naturally, the image processing methods, such as a common image aligning, stitching and blending methods, can be applied.

When the photographing time point has been reached and the user is notified before step 250 is performed, the user can reduce camera shake (i.e. movement of the camera by, for example, hand trembling) or slowly move the camera at the photographing time point so as to obtain images of the highest quality, so that it is possible to provide convenience in photographing an image. Therefore, preferably, the fact that the photographing position has been reached is notified to the user by displaying it on the preview screen through the UI or by using an external lamp or a vibratile motor of the camera. For example, when the panoramic picture photography is performed in a direction from left to right, a time point to notify that the photographing position has been reached may be set by using the accumulation value $M_x$ of the motion vectors on the x axis. Each of images forming the panoramic picture is equally divided into ten pieces. Then, a position where right-most three pieces from among the ten pieces of the previous image overlap with left-most three pieces from among the ten pieces of the current photographing image is set to be a photographing position. Further, the motion vector $M_{i,x}$ of the x axis corresponding to the time point can be set as a pre-set threshold value for the photographing position. Additionally, before the photographing position is reached, a position where right-most two pieces from among the ten pieces of the previous image overlap with left-most two pieces from among the ten pieces of the current photographing image can be set to be a time point notifying that the photographing position has been reached, and the motion vector $M_{i,x}$ of the x axis corresponding to the time point can be set as a pre-set threshold value for notifying that the photographing position has been reached.

Both the pre-set threshold value of the accumulation value $M_x$ of the motion vectors on the x axis defined to determine the photographing position and the pre-set threshold value of the accumulation value $M_x$ of the motion vectors on the x axis defined to notify that the photographing position has been reached can be set along with when setting the panoramic picture photographing environment illustrated in step 200.

It is also preferred in the aforementioned example that the photographing position has been reached is notified to a user, in consideration of the use characteristics of the user. Habits of photographing a panoramic picture may depend on each user, and photography patterns (e.g. camera movement speed, camera shake, movement angle, or the like) in photographing a panoramic picture may be varied. Therefore, when the fact that the photographing position has been reached is notified to the user in consideration of the photography patterns of the user using the camera, the user can predict the photographing position, and thus can obtain a more accurate panoramic image.

Moreover, although the above exemplary description has been made with the assumption that the photographing apparatus according to the present invention is moved by a user in photographing a panoramic picture, it is within the spirit and scope of the invention that even when the photographing apparatus is mounted on a separate movable device such that it can automatically move, the present invention can be also applied without any modification. Furthermore, although the above description has been made with the example where a camera photographs a panoramic picture in a generally horizontal direction or a generally vertical direction in photographing the panoramic picture, the present invention can be also applied to the case where the camera photographs a panoramic picture in a mixed manner of horizontal and vertical directions (i.e. the case where a plurality of images constituting the panoramic picture are longitudinally or transversely aligned to have a mosaic array). It is noted that various types of UIs except for the above-described UIs may be expressed in various manners.

In a method for photographing a panoramic picture according to the present invention, it is possible to automatically determine a photographing direction, and automatically photograph respective images forming a panoramic picture.

In addition, according to the present invention, it is also possible to automatically recognize an accurate photographing direction, by applying a motion estimation technique in consideration of matters required for decision of an automatic photographing direction.

According to the present invention, it is also possible to rapidly and accurately estimate a photographing time point, by applying a motion estimation technique in consideration of matters required to automatically photograph respective images forming a panoramic picture.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for photographing a panoramic picture, comprising the steps of:
    (a) obtaining a first image by a photographing apparatus in response to a request for a panoramic picture photography;
    (b) identifying a motion of the photographing apparatus having obtained the first image, by applying a first motion estimation technique to currently input images that simultaneously identifies vertical and horizontal motions that are continuously accumulated up to a preset threshold value;
    (c) automatically determining a photographing direction based on the identified motion of the photographing apparatus;
    (d) selectively applying a second motion estimation technique for estimating motion for at least one of a horizontal direction utilizing a motion vector corresponding to the X-axis or a vertical direction utilizing a motion vector corresponding to the Y-axis, according to the determined photographing direction, and identifying motion of the photographing apparatus thereby;
    (e) judging photographing time points of respective images by identifying that the identified motion of the photographing apparatus from step (d) has reached the preset threshold value for decision of a photographing time point, which preset threshold value comprises motion vector values accumulated in the vertical or horizontal directions; and
    (f) photographing images at the photographing time points of the respective images.

2. The method as claimed in claim 1, wherein the first motion estimation technique includes estimating motion for a slanted motion having both a horizontal and vertical direction components.

3. The method as claimed in claim 1, wherein, in step (c), the photographing direction of the panoramic picture is determined by identifying that the motion of the photographing apparatus has reached the threshold value.

4. The method as claimed in claim 3, wherein the threshold value includes a preset photographing direction.

5. The method as claimed in claim 1, wherein the first motion estimation technique of step (b) comprises a diamond search method.

6. The method as claimed in claim 1, wherein, when the photographing direction determined in step (e) comprises a horizontal direction, the motion of the photographing apparatus is identified by the second motion estimation technique, the second motion estimation technique being a motion estimation technique for estimating motion in a horizontal direction.

7. The method as claimed in claim 1, wherein, when the photographing when the photographing direction determined in step (c) comprises a vertical direction, the motion of the photographing apparatus is identified by the second motion estimation technique, the second motion estimation technique being a motion estimation technique for estimating motion in a vertical direction.

8. The method as claimed in claim 6, wherein the second motion estimation technique estimates motion in a horizontal direction corresponding to a horizontal hexagonal search method.

9. The method as claimed in claim 7, wherein the second motion estimation technique estimates motion in a vertical direction corresponding to a vertical hexagonal search method.

10. The method as claimed in claim 1, wherein step (d) comprises outputting a User Interface (UI) for guiding movement of a corresponding photographing apparatus in the photographing direction determined in step (c), after identifying the motion of the photographing apparatus.

11. The method as claimed in claim 1, wherein, in step (d), the motion of the photographing apparatus is identified by comparing currently input images in real-time with previous images, a preset zone within the entire range of the current frames is set to a motion area tracking zone, and motion information is obtained through comparison of previous frames for images within the motion area tracking zone.

12. The method as claimed in claim 11, wherein, in step (d), at least one pixel block with a preset size is set within the motion area tracking zone, pixel blocks corresponding to previous frames most similar to corresponding pixel blocks are detected, and the motion information is obtained by using a relative location variation degree between corresponding pixel blocks.

13. The method as claimed in claim 1, wherein step (f) comprises:
    displaying, on the photographing apparatus, the photographing time point of each of the images that has been reached; and
    photographing images in response to a photographing instruction signal input.

14. The method as claimed in claim 1, wherein, in step (f), the photographing time point of each of the images that has been reached is displayed on the photographing apparatus, and a corresponding image is automatically photographed.

15. The method as claimed in claim 1, wherein image photography information including a distance from a subject and optical magnification is identified to calculate a distance of an actual photography range of an image, and motion of the photographing apparatus is identified in consideration of the distance of the actual photography range of the image.

16. The method as claimed in claim 1, wherein the preset threshold value indicating that the photographing time point is reached in step (e) is set in reflection of a photograph pattern that includes a camera movement speed, a rotation angle, and a degree at which the camera is shaken, while the user performs panoramic photographing.

* * * * *

UNITED STATES PATENT AND TRADEMARK OFFICE
CERTIFICATE OF CORRECTION

PATENT NO. : 8,279,288 B2
APPLICATION NO. : 12/336766
DATED : October 2, 2012
INVENTOR(S) : Byung-Jun Son et al.

Page 1 of 1

It is certified that error appears in the above-identified patent and that said Letters Patent is hereby corrected as shown below:

In the Claims:

Column 11, Claim 7, Lines 56-57 should read as follows:
--...wherein, when the photographing direction determined...--

Signed and Sealed this
Thirtieth Day of April, 2013

Teresa Stanek Rea
*Acting Director of the United States Patent and Trademark Office*